June 1, 1943.　　J. R. GILL ET AL　　2,320,585
AUTOMATIC TRAILER BRAKE
Filed Aug. 29, 1941　　2 Sheets-Sheet 2
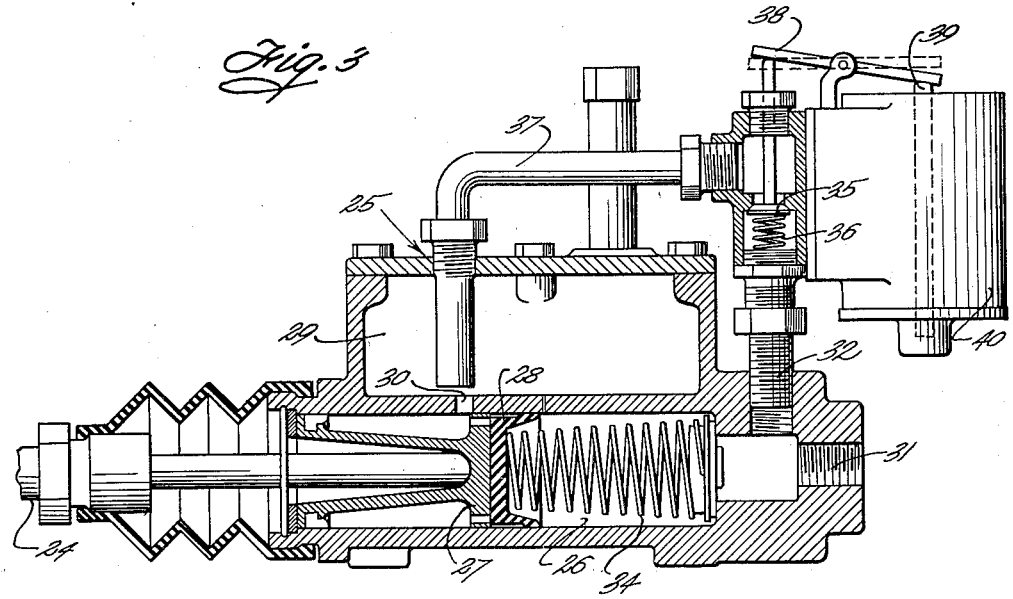
Inventors
JAMES R. GILL
WALTER SOLON
By Hazard & Miller
Attorneys Patented June 1, 1943

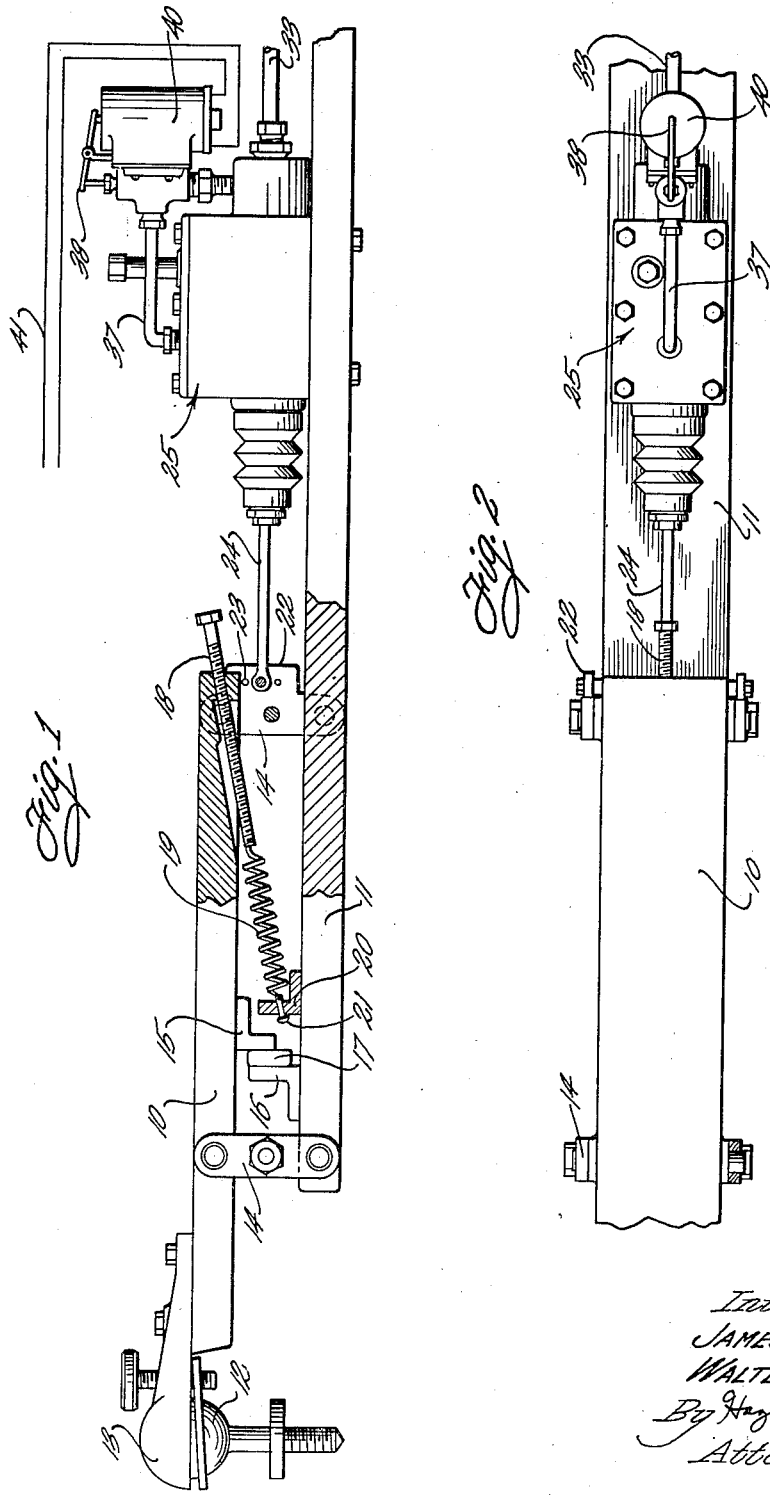

2,320,585

UNITED STATES PATENT OFFICE 2,320,585

AUTOMATIC TRAILER BRAKE

James R. Gill and Walter Solon, Los Angeles, Calif.

Application August 29, 1941, Serial No. 408,804

2 Claims. (Cl. 188—142)

This invention relates to a means for automatically applying brakes of trailers or towed vehicles.

An object of the invention is to provide a construction for connecting a trailer or towed vehicle to a towing vehicle which is automatically operable to apply the brakes of the trailer or towed vehicle whenever the towing vehicle decelerates with respect to the trailer or towed vehicle, or in other words, whenever the trailer or towed vehicle tends to approach or gain on the towing vehicle.

Another object of the invention is to provide an automatic means for applying the brakes of a trailer or towed vehicle as above described, which is adjustable to compensate for varying conditions, such as for example, varying loads imposed on the trailer.

Still a further object of the invention is to provide a means for automatically applying the brakes on a trailer whenever the trailer gains upon or approaches its towing vehicle which is so designed that the automatic means may be rendered inoperative so that the brakes of the trailer will not be applied whenever the towing vehicle is pushing or backing up the trailer.

Another object of the invention is to provide a trailer hitch embodying the above-mentioned characteristics which is of relatively simple and durable design.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the means for automatically applying the brakes of a trailer which embodies the present invention, parts being broken away and shown in vertical section;

Fig. 2 is a top plan view of the same, parts being broken away and shown in horizontal section; and Fig. 3 is a sectional view of a hydraulic brake applying means forming a part of the present invention.

Referring to the accompanying drawings wherein similar reference characters designate similar parts throughout, the present invention comprises two hitch beams 10 and 11. The upper hitch beam 10 is adapted to be connected to a towing vehicle and will consequently hereinafter be referred to as the towing hitch beam. The lower hitch beam 11 is adapted to be attached to a trailer or towed vehicle or may form a part thereof and will hereinafter be referred to as the towed hitch beam.

The towing hitch beam 10 may be connected to the towing vehicle by any suitable or preferred construction, such as for example a ball 12 adapted to be mounted on the towing vehicle and a socket 13 which may be attached to the towing hitch beam. The two hitch beams are connected together by a plurality of shackles 14 and while two shackles have been illustrated as connecting the hitch beams, it will be understood that three or even four shackles may be employed for this purpose for safety purposes. These shackles permit of relative movement to take place between the hitch beams 10 and 11. However, forward movement of the towing hitch beam 10 relative to the towed hitch beam 11 is limited by opposed stops 15 and 16 which may be in the form of short sections of angle iron welded or otherwise attached to the opposed faces of the hitch beams. In the preferred form of construction a rubber bumper 17 is fastened to one of these stops to avoid sharp contact or engagement between the stops.

A screw 18 is threaded into the upper hitch beam 10 and is connected to a tension spring 19 which in turn is connected to a spring anchor 20 by means of a swivel bolt 21. This screw may be adjusted to vary the tension of spring 19 so that although rearward movement of the towing hitch beam 10 relative to the towed hitch beam 11 is permissible, it is, nevertheless, yieldably resisted by the spring and the degree of resistance afforded by the spring 19 will be varied by the adjustment of the screw 18. Rearward movement of the towing hitch beam 10 relatively to the towed hitch beam is ultimately limited by the stop on the towing hitch beam engaging spring anchor 20.

The rear shackle 14 is equipped with wings 22 in which are formed a series of apertures 23. These apertures serve to adjustably connect a push rod 24 of a brake operating mechanism, generally designated at 25. The push rod 24 may be connected to any one of the apertures 23 so that its position will be varied along the length of the rear shackle and consequently, the throw transmitted to the push rod may be varied.

The brake operating mechanism 25 is illustrated in detail in Fig. 3, and contemplates that the trailer or towed vehicle will be equipped at its wheels with hydraulically operable brakes. Under these circumstances the brake operating mechanism consists of a cylinder 26 within which there is disposed a ported piston 27 having a cup leather or cup washer 28. Adjacent the cylinder there is a reservoir 29 from which liquid may pass into the cylinder through a port 30. The cylinder 26 has two outlets, one being indicated at 31 and the other being indicated at 32. Outlet 31 has tubing 33 connected thereto which communicates with the hydraulic brakes on the trailer. It will be appreciated that when the piston 27 is moved toward the right by push rod 24 that pressure developed in the cylinder will be transmitted to the brakes of the trailer to apply these brakes. A coil spring 34 serves to return the piston 27 whenever this is permitted by the push rod 24 to release the brake. The outlet 32 leads through a valve 35 which is normally closed by a spring 36 to a return bypass 37 which returns fluid to the reservoir 29. Valve 35 is adapted to be opened by a rocker arm 38 which is operable by the armature 39 of a solenoid 40. The solenoid is connected by conductors 41 to a switch which may be located on the dashboard of the towing vehicle.

The operation and advantages of the above-described construction are as follows. When the towing vehicle for pulling the trailer the towing hitch beam 10 is in its forwardmost position as illustrated in Fig. 1, wherein the stops 15 and 16 are in engagement except for the bumper 17. Whenever the towing vehicle decelerates or the trailer tends to gain on the towing vehicle this causes the towed hitch beam 11 to move forwardly relative to the towing hitch beam 10. The forward movement is permitted by the shackles 14 but is to some extent resisted by the tension of spring 19. Whenever towed hitch beam 11 moves forwardly the brake operating mechanism mounted thereon is also carried forwardly. However, forward movement of the push rod 24 is resisted by its being connected to the rear shackle. This causes the piston 27 to be forced rearwardly in its cylinder to generate fluid pressure in the cylinder which is transmitted to the hydraulic brakes, causing them to be automatically applied. The degree of application of the brakes will to some extent depend upon the tension on spring 19 and the hole 23 to which the push rod 24 is connected. If the push rod is connected to the uppermost hole 23 only a slight amount of movement of the towed hitch beam 11 will cause the push rod 24 to be forced rearwardly with but little power or mechanical advantage. Conversely, if the push rod 24 is attached to the lowermost hole 23 the lower hitch beam 11 will be required to swing forwardly a considerable distance to accomplish the same degree of throw of the push rod. However, the force transmitted to the push rod under these circumstances will be with great mechanical advantage.

In going down grade or in backing up the trailer, it is manifest that the lower hitch beam 11 will swing forward relative to the hitch beam 10 but it may not be desired to apply the brakes on the trailer under these circumstances. Under these conditions the electrical circuit through the solenoid 40 may be closed by the switch on the dashboard of the towing vehicle lifting the armature 39 and causing the rocker arm 38 to unseat valve 35. When valve 35 is unseated, the pressure within the cylinder 26 is released and fluid may be expelled therefrom and returned to the reservoir 29. Manifestly, whenever the pressure within cylinder 26 is released it will not be effective to apply the brakes of the trailer.

While the invention has been illustrated as being applicable to a trailer equipped with hydraulic brakes, it is manifest that it is equally applicable to trailers equipped with mechanically operable brakes, compressed air brakes, or electrically operable brakes. Whatever the operating mechanism for the brakes of the trailer may be the push rod 24 may be connected thereto to effect an application of the brakes whenever the lower hitch beam 11 tends to swing forwardly with respect to the upper hitch beam 10.

From the above-described construction it will be appreciated that the improved hitch for trailers is of relatively simple and durable design and is automatically operable to apply the trailer brakes whenever the trailer tends to approach the towing vehicle. It is readily adjustable to compensate for varying conditions and various loads that may be placed on the trailer, and whenever desired it may be rendered inoperative for down-grade or backing up purposes.

Various changes may be made in the details of construction without departing from the spirit or scope of the invention as defined by the appended claims.

We claim:

1. A trailer brake comprising a towing hitch beam, a towed hitch beam, shackles connecting the hitch beams, stop means between the hitch beams limiting forward movement of the towing hitch beam relative to the towed hitch beam in a position wherein the hitch beams are in spaced relation to each other, spring means urging the towed hitch beam rearwardly with relation to the towing hitch beam, and means operatively connected to one of the shackles for applying the brakes of a trailer on which the towed hitch beam may be mounted upon rearward movement of the towing hitch beam relative to the towed hitch beam.

2. A trailer brake operating means comprising a towed hitch beam, a towing hitch beam, shackles connecting the hitch beams, stop means between the hitch beams limiting forward movement of the towing hitch beam relative to the towed hitch beam in a position wherein the hitch beams are spaced from each other, spring means between the hitch beams urging the towed hitch beam rearwardly with relation to the towing hitch beam, and means connected to one of the shackles between the hitch beams and operatively connected to the trailer brakes for applying the trailer brakes when the towed hitch beam moves forwardly relatively to the towing hitch beam.

JAMES R. GILL.
WALTER SOLON.